Aug. 9, 1938.  A. LANGSNER  2,126,335
TELESCOPE
Filed Nov. 2, 1934  2 Sheets-Sheet 2
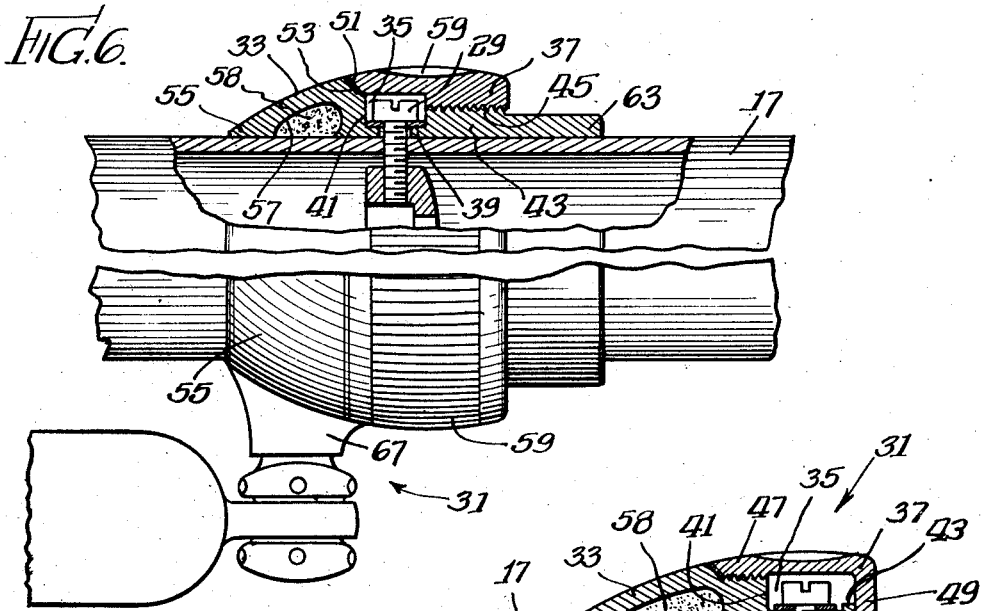
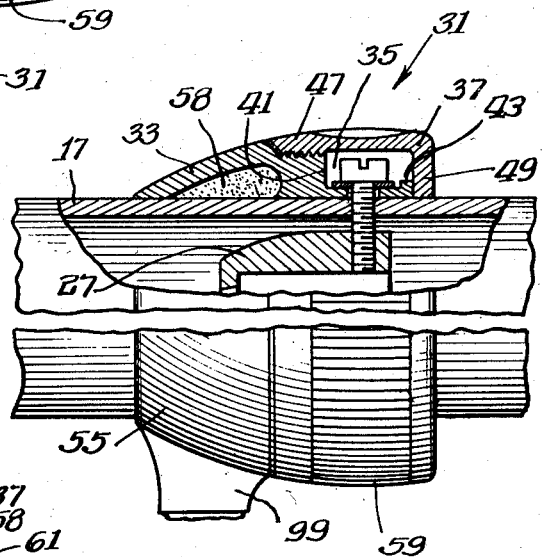
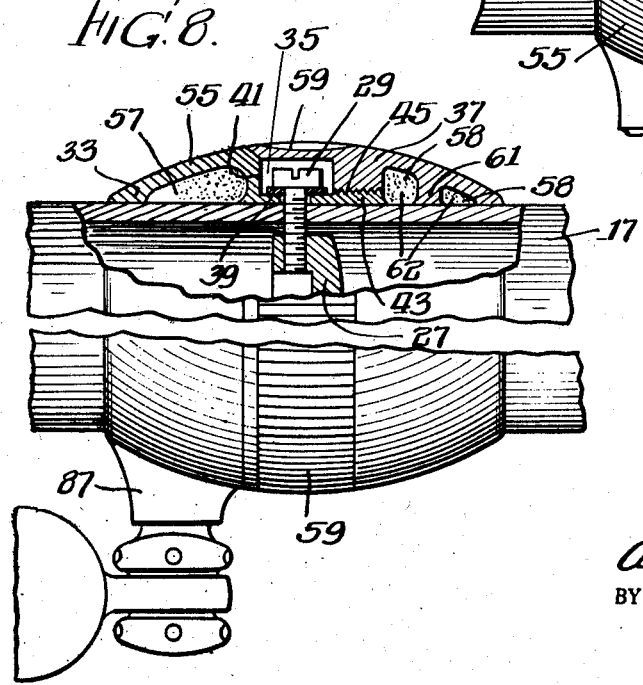
INVENTOR.
Adolph Langsner
BY Cox & Moore
ATTORNEYS.

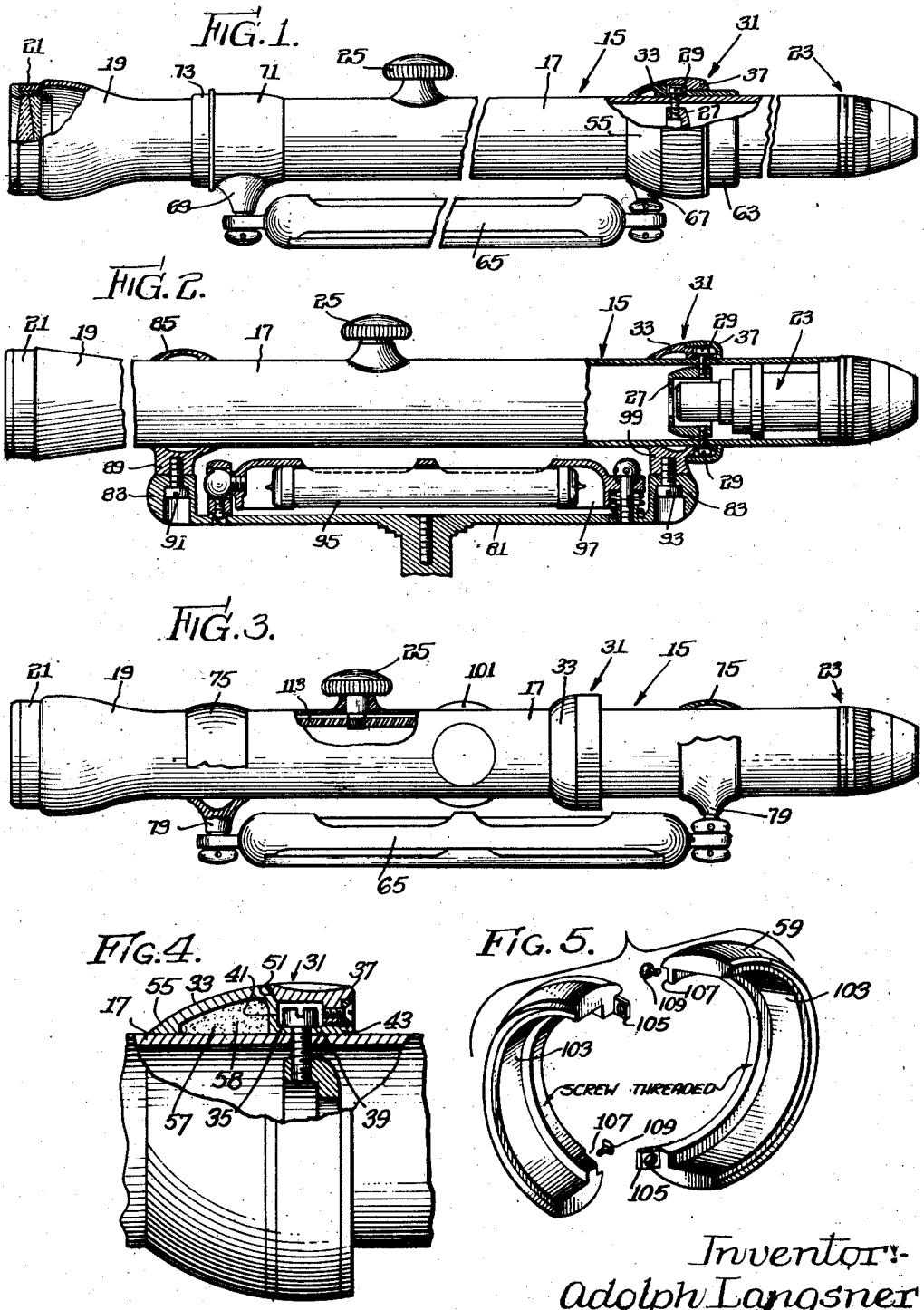

Patented Aug. 9, 1938

2,126,335

UNITED STATES PATENT OFFICE 2,126,335

TELESCOPE

Adolph Langsner, Chicago, Ill., assignor to Eugene Dietzgen Company, Chicago, Ill., a corporation of Delaware Application November 2, 1934, Serial No. 751,242

13 Claims. (Cl. 88—32)

My invention relates in general to telescopes and has more particular reference to telescopes adapted for use in surveying instruments such as levels, transits, and the like.

An important object is to provide telescopes of improved streamlined appearance and of simplified construction whereby operation of the instruments is facilitated, the operating parts of the instrument being designed to exclude dirt and other foreign matter from entering the same and causing deterioration.

A further object is to provide telescope supporting means of light-weight construction, yet sufficiently rigid to perform the supporting function.

Another important object is to provide a telescope having an adjustable part therein and adjusting means accessible from outside of the telescope and operable to adjust the part within the telescope, including closure means for concealing the exposed portions of the adjusting means and preventing entry of foreign matter into the casing of the telescope.

Another important object is to arrange the frame of the closure assembly as a support for a spirit level.

Another important object is to arrange the frame of the closure assembly as a Y bearing for said telescope.

Another important object is to provide a telescope with spaced apart spirit level saddles and to form said saddles to provide Y bearings for said telescope.

Another important object is to arrange the frame of the closure assembly with a pedestal for mounting the telescope on the dumpy frame.

Another important object is to provide a telescope, having an internal part and adjusting means extending and exposed outwardly of the telescope, and removable annular cover means for concealing the exposed adjusting means and to form said annular cover means as a split ring whereby to facilitate assembly of the same upon the telescope.

Numerous other objects and advantages of the invention will be apparent from the following description, which, taken in connection with the accompanying drawings, discloses preferred embodiments of the invention.

Referring to the drawings:

Figures 1, 2, and 3 are perspective views, partially in section, of telescopes embodying my present invention;

Figure 4 is an enlarged perspective view, partially in section, showing the closure assembly used in Figure 3;

Figure 5 is a perspective view illustrating the preferred construction of a part of the assembly shown in Figure 4;

Figure 6 is an enlarged perspective view partially in section, illustrating the closure assembly shown in Figure 1;

Figure 7 is an enlarged perspective view, partially in section, showing the closure assembly used in Figure 1; and Figure 8 is an enlarged perspective view, partially in section, showing a modified enclosure assembly.

To illustrate my invention, I have shown, on the drawings, various embodiments of the invention as applied to a telescope 15, of substantially streamlined appearance. The telescope in each of the illustrated embodiments comprises a tubular barrel 17 of preferably cylindrical configuration, which may be belled or enlarged at one end as at 19 to receive an objective lens assembly 21. The end of the telescope opposite from the objective lens assembly may be provided with an eye piece assembly 23, the exposed portions of which are preferably shaped to a bullet nose configuration in order to improve the appearance of the telescope and reduce wind resistance. A laterally projecting manually operable knob 25 may also be provided upon the barrel of the telescope to enable adjustment of a focusing slide of any suitable or convenient form within the barrel of the telescope. Opposite the inner end of the eye piece assembly 23, a cross hair reticle 27 is arranged. This reticle comprises a part adjustable within the barrel of the telescope as by means of threaded adjusting screws 29 mounted radially on the reticle and extending through a circumferentially arranged series of openings in the wall of the barrel opposite the position occupied by the reticle therein.

The screws 29 have heads received in a closure assembly 31 carried on the barrel and comprising a frame 33 formed with an annular channel 35, in which the heads of the adjusting screws 29 are received as shown clearly in Figures 4, 6, 7 and 8 of the drawings. A removable cover 37, adapted for mounting on the frame in position to sealingly enclose the heads of the adjusting screws 29, is provided.

It is an important object of my present invention to prevent ingress of foreign matter into the interior of the barrel of the telescope at the openings through which the adjusting screws 29 extend as well as at the eye piece assembly and at the focusing knob. To this end, the frame 33, in each embodiment, comprises an annular sleeve having inwardly facing surfaces snugly seated upon the exterior surface of the telescope and having portions extending on each side of the adjusting screw openings. The sleeve, forming the frame 33, has portions 39, of reduced sectional thickness and provided with perforations in alignment with the perforations of the telescope barrel, through which the adjusting screws 29 extend. The frame 33, on at least one side of the perforated portion 39, is flanged to provide a shoulder 41 defining one side of the groove 35, and the portion 39 is extended as at 43 at the other side of the groove.

One or the other, or both of the spaced portions 41 and 43 of the frame may be threaded to receive correspondingly threaded portions 45 formed on the cover 37. As shown in Figures 4, 6, and 8, the portion 43 is threaded to receive the correspondingly threaded portions 45 of the cover, the abutment 41 being preferably grooved as at 51 in order to snugly receive an edge of the cover 37 when the same is threaded on the portion 43 of the frame. If desired, a sealing gasket 53 of suitable resilient material may, as shown in Figure 6, be interposed in the groove 51 in order to prevent foreign matter from entering the space 35 through said groove when the cover is in place.

In Figures 2 and 7, the portion 41 is threaded to receive a correspondingly threaded portion 47 of the cover while the portion 43 of the frame provides an abutment for snugly engaging a flanged portion 49 of the cover when the same is secured on the frame. The flange 49 may be and preferably is of yielding character, so that as the cover is tightened on the frame, the flange 49 will exert a resilient wiping pressure upon the abutment 43 in order to seal the parts against the entrance of foreign matter therebetween into the space 35. I may also impose a sealing gasket between the parts 43 and 49 if desired.

I prefer also to form the cover 37 and the frame 33 to provide a substantially streamlined appearance on the telescope when the parts are in closed position. To this end, the frame 33, as shown in Figures 4, 6, 7 and 8, has portions 55 extending along the barrel of the telescope away from the shouldered portion 41. The outer surfaces of the extension portion 55 are preferably curved, as shown, in order to impart a pleasing streamlined appearance. The inner surfaces of the portions 55 preferably snugly engage the barrel of the telescope at least at the terminal edge of the portion 55, although the portions 55 may be internally grooved or pocketed as at 57 in order to reduce weight and also to afford a space in which a sealing medium 58 may be assembled in order to prevent seepage of foreign matter along the barrel of the telescope within the sleeve-like frame 33. The outer peripheral surfaces of the cover 37 are preferably curved to continue the configuration of the outer portions of the surfaces 55 and also may be knurled as at 59 to facilitate attachment or removal of the same from mounted position on the frame 33.

As shown in Figure 8, the cover 37 may be formed with portions 61 extending substantially beyond the end portion 43 of the frame, and these portions 61 may have outer surfaces shaped to correspond with the curvature of the frame extension 55 in order to impart a balanced appearance to the reticle closure substantially as shown in Figure 8. The inner surfaces of the extended portions 61 preferably snugly, though slidingly engage the outer surfaces of the telescope barrel and are, or may be, pocketed as at 62 to reduce the weight of the cover and to afford openings for the reception of a sealing medium 64, preferably in gasket form, to prevent penetration of foreign matter along the barrel between the same and the cover.

In Figure 1 of the drawings, I have shown a telescope particularly adapted for use in a so-called Y level, in which the telescope is journalled in a suitable fashion for rotation about its axis. In a telescope for such purpose, I may utilize the frame 33 of the reticle closure assembly to provide a bearing surface on the telescope whereby to mount the same rotatingly in a Y level support. To this end, the portion 43 of the frame is formed with an extension 63 projecting beyond the edge of the cover 37, said portion 63 providing a bearing adapted to rest in a Y level support.

I also prefer, whenever possible, to form the frame 33 with a projecting portion 67 forming a saddle for mounting at least one end of a spirit level on the telescope, as shown in Figures 1, 6, 7 and 8. The other end of the spirit level may be secured to the telescope by attaching the same on a saddle 69 forming an integral part of a sleeve 71 mounted on the telescope in spaced relationship with respect to the frame 33, and said sleeve 71, if desired, may be formed with an annular outwardly facing bearing surface 73 adapted for the reception of a Y level support, it being understood that a Y level telescope is usually supported in spaced Y clamps positioned to receive the Y bearings 63 and 73.

In Figure 2 of the drawings, I have shown a telescope particularly adapted for use in a dumpy level, wherein the telescope is permanently assembled on a support frame 81, the telescope being secured on spaced pedestal portions 83 formed in the frame 81. In order to support the telescope, it is or may be provided, near the objective end of the telescope, with a collar 85 having a projection 89 adapted to rest on one of the pedestals 83 and to be secured thereon by means of a fastener 91. The other end of the telescope may be mounted on the remaining pedestal 83 by forming, on the frame 33, of the reticle closure assembly, a projection 99 adapted to rest upon and be secured on the pedestal by means of a fastener 93 similar to the fastener used in securing the projection 89 on the other pedestal. The dumpy level assembly also includes a spirit level which, as shown in Figure 2, comprises a vial 95 and a housing 97 for said vial, which housing is adjustably secured, preferably on the support member 91 in any suitable fashion, such as by the arrangement illustrated. The vial, vial housing, and mode of attaching the same on the support 81 does not, however, form a part of my present invention, and I do not herein claim the novel features thereof since the same forms the subject matter of my co-pending application, Serial Number 751,241, filed the second day of November, 1934.

In Figure 3 of the drawings, I have shown a telescope fitted with a pair of sleeves 75 providing saddles 77 and 79, corresponding to the saddles 67 and 69 shown in Figure 1 of the drawings and on which a spirit level 65 may be mounted. The telescope is also fitted with means 101 for mounting the same in a transit assembly. I have here illustrated a situation encountered not only in telescopes adapted for use in transits, but also wherever the reticle closure assembly is located between projecting elements, such as the devices 75 and 101 carried by the telescope barrel, and over which it is impossible, on account of the overall dimension of the projecting elements, to assemble the annular cover 37. In assembling a telescope of this character, it is usually necessary to apply the element 101, the frame 33, and the elements 75 by slipping the same consecutively onto the barrel from the eye piece end thereof and shrinking the same snugly on the barrel of the telescope before the eyepiece is assembled. It is desirable, for practical reasons, not to have the cover member 37 assembled on the barrel during the shrinkage operation by which the elements 33, 75, and 101 are positioned. After said element 75 is positioned, however, it may have an overall dimension preventing the assembly of the cover 37 on the barrel of the telescope. To overcome this difficulty, I may form the cover 37 as shown in Figure 5 of the drawings, wherein the cover comprises two or more sections 103 having interfitting portions at the abutting ends of the sections and preferably comprising a lug 105 on one section and a corresponding socket 107 on another section. The sections may be secured together around the barrel of the telescope by means of fastening devices 109, preferably set screws, adapted to penetrate perforations in the lugs 105 and hold the same on the seats 107.

The reticle closure assembly affords means preventing foreign matter from entering the telescope barrel while at the same time furnishing an attractive streamline appearance on the telescope. The reticle closure moreover may be utilized to afford a saddle for the attachment of a spirit level on the telescope or for mounting the telescope in a support, or for both purposes, thereby permitting elimination of certain parts.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

Having thus described my invention, what I claim as new and desire to secure by Letters Patent is as follows:

1. A telescope comprising a barrel, an adjustable element in the barrel, an annular collar on the barrel having a groove accessible from outside of the telescope, and an adjusting screw for said element operatively engaging the same within the barrel and extending in position for operation on said collar outwardly of said barrel, said adjusting screw having a head extending in the groove of said collar whereby the same may be manipulated from outside of the barrel in order to adjustably shift the adjustable element within the barrel, and an annular cover attachable on said collar in position to cover the head of said screw in said groove whereby to exclude access of foreign matter to said screw head, said collar having an inner surface engaging the outer surface of said barrel, the inner surface of said collar being grooved to provide an annular collecting pocket for entrapping foreign matter penetrating between the barrel and an edge of said collar whereby to prevent the same from reaching the barrel opening in which the adjusting screw extends.

2. A telescope as set forth in claim 1 wherein said annular groove contains packing material.

3. A telescope as set forth in claim 1, in which the collar is formed with an extension for mounting the telescope on a support.

4. A telescope as set forth in claim 1, in which the collar has an extension forming an annular bearing for mounting the telescope in the clamp of a Y level.

5. A telescope as set forth in claim 1, in which the collar is formed with a projecting portion forming a mounting pedestal.

6. A telescope as set forth in claim 1, in which the collar is formed with an annular seat and the cover has a resilient rim adapted to wipe upon and frictionally engage the seat when applied in order to form a dust-proof seal at said seat.

7. In a telescope comprising a barrel having a lateral opening, and an adjustable element within the barrel, the combination of a collar snugly embracing said barrel and having an opening therein in alinement with the said barrel opening, adjusting means on said collar and extending into said alined openings and operatively associated with said adjustable element whereby the relative position of said element within the barrel may be adjusted by manipulating the adjusting means from outside of the barrel, and cover means operatively associated with said collar, said cover and said collar each having a portion extending axially of the barrel beyond an end edge of the other and having annular pockets formed in the inner surfaces of said portions whereby to define an annular chamber around the barrel in which foreign matter entering between the barrel and said cover and said collar is entrapped, to prevent the entrance of such foreign matter into the barrel between the alined openings in which the adjusting means extends.

8. A device as set forth in claim 7 in which the annular pocket contains packing material to assist in the entrapment of foreign matter in said pocket.

9. A telescope comprising a barrel, an adjustable element within the barrel, a mounting frame on the barrel, adjusting means for the element having a shiftable portion on said frame outwardly of said barrel, and cover means carried by said frame in position to enclose the shiftable portion of said adjusting means on said frame, and an extension formed on said frame and providing a mounting for supporting the telescope.

10. A telescope comprising a barrel, an adjustable element within the barrel, a mounting frame on the barrel, adjusting means for the element having a shiftable portion on said frame outwardly of said barrel, and cover means carried by said frame in position to enclose the shiftable portion of said adjusting means on said frame, and an extension formed on said frame and providing a mounting comprising a pedestal for attaching an auxiliary device on the telescope.

11. A telescope comprising a barrel, an adjustable element within the barrel, a mounting frame on the barrel, adjusting means for the element having a shiftable portion on said frame outwardly of said barrel, and cover means carried by said frame in position to enclose the shiftable portion of said adjusting means on said frame, and an extension comprising an annular portion forming a bearing for mounting the telescope in a support.

12. A telescope comprising a barrel, an adjustable element within the barrel, a mounting frame on the barrel, adjusting means for the element having a shiftable portion on said frame outwardly of said barrel, said frame having an annular threaded portion adjacent the shiftable portion of the adjusting means, and annular cover means threaded on and carried by said frame in position to enclose the shiftable portion of said adjusting means on said frame, said cover means comprising separable sections and holding means for securing the sections together.

13. A telescope as set forth in claim 12 wherein the cover comprises an annular segmental member formed of at least a pair of cooperating segments having interfitting portions, and means to secure the interfitting portions together.

ADOLPH LANGSNER.